United States Patent Office 3,188,308
Patented June 8, 1965

3,188,308
12-ACYLAMINOSTEROID OF THE
PREGNANE SERIES
Kanzo Sasaki, Osaka-shi, and Junichi Kawanami, Toyo-naka-shi, Japan, assignors to Shionogi & Co., Ltd., Osaka, Japan
No Drawing. Filed Apr. 16, 1963, Ser. No. 273,320
Claims priority, application Japan, Apr. 20, 1962, 37/16,347
19 Claims. (Cl. 260—239.55)

The present invention relates to 12-acylaminosteroids and production thereof. More particularly, it relates to 12-acylaminosteroids of pregnane series possessing anti-progestational activity and production thereof.

The said 12-acylaminosteroid of pregnane series is representable by the following formula:

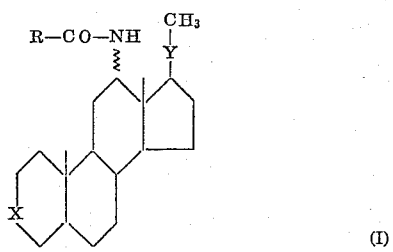

wherein R represents a hydrogen atom or a lower alkyl group (e.g. methyl, ethyl, propyl), X and Y each represents a methylene group, a hydroxymethylene group, a formyloxymethylene group, a lower alkanoyloxymethylene group (e.g. acetyloxymethylene, propionyloxymethylene, butyryloxymethylene), a carbonyl group, a lower alkyl-enedioxymethylene group (e.g. ethylenedioxymethylene, trimethylenedioxymethylene) or a di(lower)alkoxy-methylene group (e.g. dimethoxymethylene, diethoxy-methylene), a double bond can exist between the 5-position and the adjacent position thereto and, when it does not exist, the hydrogen atom at the 5-position has α- or β-configuration, and the ripple mark (⅃) is a generic indication of both α- and β-configurations.

The said 12-acylaminosteroid of Formula I is prepared by subjecting the corresponding 12-aminosteriod of pregnane series represented by the following formula:

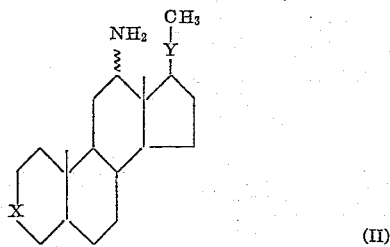

wherein X and Y each has the same significance as designated above, a double bond can exist between the 5-position and the adjacent position thereto and, when it does not exist, the hydrogen atom at the 5-position has α- or β-configuration, and the ripple mark (⅃) is a generic indication of both α- and β-configurations, to acylation.

The starting 12-aminosteroid of Formula II may be prepared, for instance, by subjecting the corresponding 12-oxosteroid of pregnane series to oximation (oxime formation) and subjecting the resultant 12-hydroxyimino-steroid of pregnane series to reduction. The concrete procedure for preparation of the 12-aminosteroid (II) has been described in detail in copending application Ser. No. 196,472 of H. Mitsuhashi, filed May 21, 1962 (now U.S. Patent No. 3,113,130).

The acylation is accomplished by treating the 12-aminosteroid (II) with a conventional acylating agent represented by the formula:

$$R—CO—R' \quad (III)$$

wherein R has the same significance as designated above, and R' represents a hydroxyl group, a lower alkoxy group (e.g. methoxy, ethoxy, propoxy), a halogen atom or a group represented by the formula: —O—CO—R wherein R has the same significance as designated above, under the reaction conditions which are usually adopted on the use of the said acylating agent. For instance, the object is attained by treating the 12-aminosteroid (II) with a carboxylic anhydride of Formula III wherein R' is a group represented by the formula: —O—CO—R at a temperature from room temperature (15 to 30° C.) to reflux temperature, if necessary, in an inert organic solvent (e.g. benzene, toluene, dichloromethane, chloroform, pyridine, picoline).

The said process results in the acylation of the amino group at the 12-position. The hydroxyl group(s), if any, at the 3 and/or 20 position(s) may be simultaneously acylated depending on the reaction conditions. Generally speaking, higher reaction temperature such as reflux tends to cause the simultaneous acylation of the said hydroxyl group(s).

The thus-produced 12-acylaminosteroid (I) possesses anti-progestational activity. In the test using rabbits, for instance, 3,20-dioxo-12α-acetylamino-4-pregnene produced significant inhibition of progestational response caused by the subcutaneous treatment of 4 milligrams of progesterone, when administered at a dose of 2.5 milligrams per horn by intrauterine injection. Other 12-acylaminosteroids of Formula I also possess the similar activity. Accordingly, they are useful as anti-progestational agents. In addition, it may be noted that they show anesthetic activity. For instance, when 3,20-dioxo-12β-acetylamino-5β-pregnane was subcutaneously administered to mice at a dose of 50 milligrams and 250 milligrams per kilogram of body weight, the anesthetic state was maintained for 1.5 hours and more than 3 hours, respectively.

Practical and presently-preferred embodiments of the present invention are illustratively shown in the following examples. In these examples, the abbreviations have the following significances: mg., milligram(s); g., gram(s), ml., millilitre(s); Anal. Calcd., analysis calculated; and ° C., degrees centigrade. Other abbreviations have conventional significances.

EXAMPLE 1

Preparation of 3,3,20,20 - bisethylenedioxy - 12α - acetyl-amino - 5(6) - pregnene and 3,3,20,20 - bisethylenedi-oxy-12β-acetylamino-5(6)-pregnene

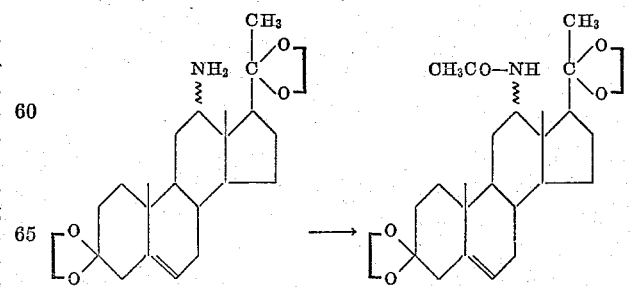

A mixture (642 mg.) of 3,3,20,20-bisethylenedioxy-12α-amino-5(6)-pregnene and 3,3,20,20-bisethylenedioxy-12β- amino-5(6)-pregnene is dissolved in a mixture of pyridine (6 ml.) and acetic anhydride (6 ml.), and the resultant mixture is allowed to stand at room temperature (15 to 30° C.) one overnight. To the reaction mixture, there is added water while cooling with ice. The resulting mixture is shaken with ether. The ether extract is washed with water, aqueous sodium carbonate and water in order. During the washing procedure, there are separated crystals between the aqueous phase and the organic solvent phase, the crystals being collected by filtration and recrystallized from methanol to give 3,3,20,20-bisethylenedioxy-12α-acetylamino-5(6)-pregnene (100 mg.) as needles melting at 202 to 205° C. The organic solvent phase is dried and evaporated. The resultant oil is crystallized from methanol to give 3,3,20,20-bisethylenedioxy-12β-acetylamino-5(6)-pregnene (109 mg.) as needles melting at 138 to 141° C.

*3,3,20,20 - bisethylenedioxy - 12α - acetylamino - 5(6)-pregnene.*—$[\alpha]_D^{24}$ $+88\pm2°$ (chloroform).

IR: $\nu_{max.}^{chloroform}$ 3422, 1662, 1501, 1377, 1097, 1052, 1034, 948, 861 cm.$^{-1}$ Anal. Calcd. for $C_{27}H_{41}O_5N.CH_3OH$: C, 68.40; H, 9.23; N, 2.85. Found: C, 68.26; H, 9.18; N, 3.27.

*3,3,20,20 - bisethylenedioxy - 12β - acetylamino - 5(6)-pregene.*—$[\alpha]_D^{24.5}$ $-32\pm2°$ (chloroform).

IR: $\nu_{max.}^{chloroform}$ 3627, 3341, 1651, 1533, 1378, 1117, 1093, 1048, 947, 879, 831 cm.$^{-1}$ Anal. Calcd. for $C_{27}H_{41}O_5N.½CH_3OH$: C, 69.42; H, 9.11; N, 2.95. Found: C, 69.57; H, 9.20; N, 3.00.

The starting material of this example, a mixture of 3,3,20,20-bisethylenedioxy - 12α - amino - 5(6) - pregnene and 3,3,20,20-bisethylenedioxy-12β-amino-5(6)-pregnene, is prepared from 3,20-dioxo-12α-acetyloxy-4-pregnene [Just et al.: J. Org. Chem., vol. 23, page 12 (1958)] according to the following scheme:

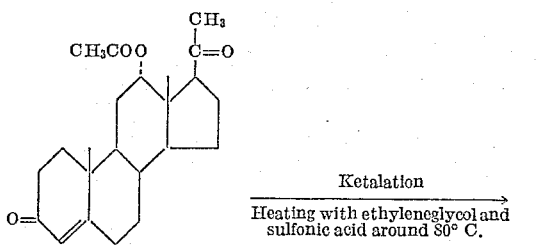

Ketalation
Heating with ethyleneglycol and sulfonic acid around 80° C.

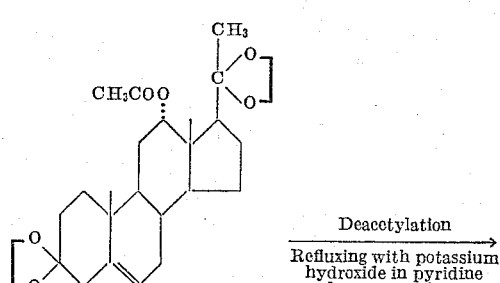

Deacetylation
Refluxing with potassium hydroxide in pyridine and aqueous ethanol.

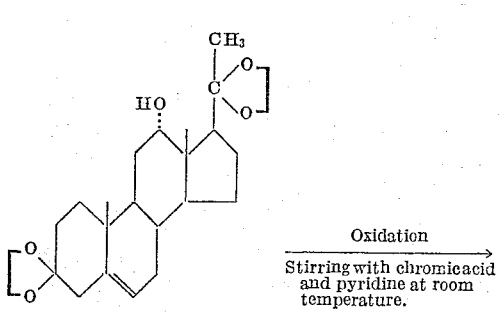

Oxidation
Stirring with chromic acid and pyridine at room temperature.

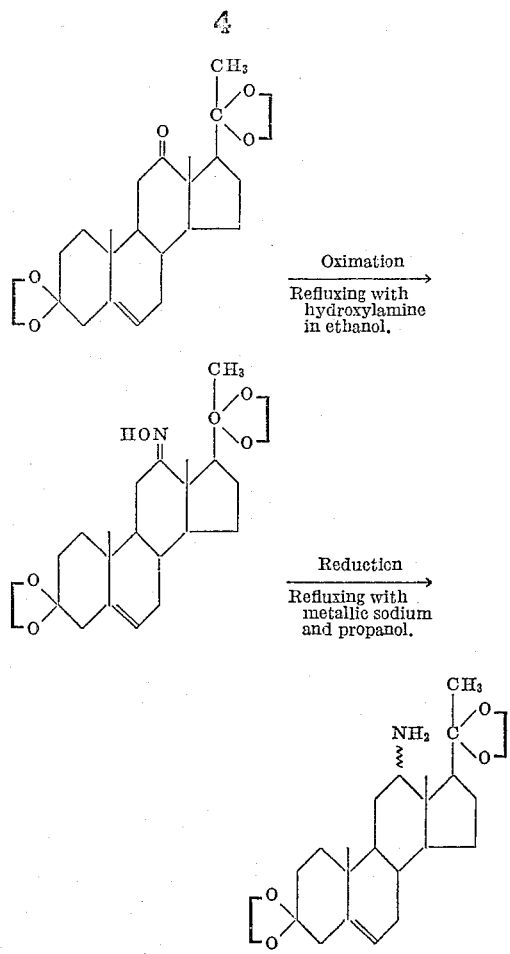

Oximation
Refluxing with hydroxylamine in ethanol.

Reduction
Refluxing with metallic sodium and propanol.

EXAMPLE 2

*Preparation of 3,20-dioxo-12α-acetylamino-4-pregnene and 3,20-dioxo-12β-acetylamino-4-pregnene*

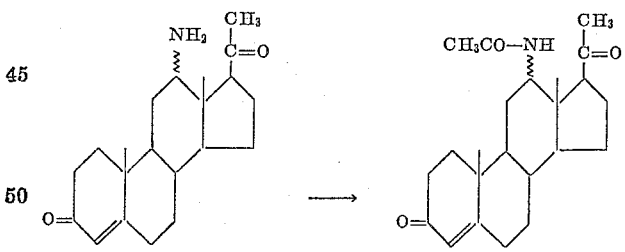

A mixture of 3,20-dioxo-12α-amino-4-pregnene and 3,20-dioxo-12β-amino-4-pregnene is subjected to acetylation as in Example 1 whereby 3,20-dioxo-12α-acetylamino-4-pregnene and 3,20-dioxo-12β-acetylamino-4-pregnene are obtained as pillars melting at 128 to 131° C. (crystallized from methanol) and plates melting at 254 to 256° C. (decomp.) (crystallized from acetone), respectively.

*3,20 - dioxo - 12α - acetylamino-4-pregnene.*—$[\alpha]_D^{22.5}$ $+226\pm2°$ (chloroform).

IR: $\nu_{max.}^{chloroform}$ 3625, 3423, 3372, 1697, 1664, 1618, 1502, 870 cm.$^{-1}$ Anal. Calcd. for $C_{23}H_{33}O_3N.CH_3OH$: C, 71.43; H. 9.24; N, 3.47. Found: C, 71.20; H, 9.02; N, 3.52.

*3,20 - dioxo - 12β - acetylamino-4-pregnene.*—$[\alpha]_D^{21}$ $+82\pm2°$ (chloroform).

IR: $\nu_{max.}^{chloroform}$ 3356, 1696, 1659, 1617, 1513, 868 cm.$^{-1}$

Anal. Calcd. for $C_{23}H_{33}O_3N$: C, 74.36; H, 8.95; N, 3.77. Found: C, 74.14; H, 8.99; N, 3.50.

The starting material of this example, a mixture of 3,20-dioxo-12α-amino-4-pregnene and 3,20-dioxo-12β-amino-4-pregnene, is prepared from a mixture of 3,3,20,20-bisethylenedioxy-12α-amino-5(6)-pregnene and 3,3,20,20-bisethylenedioxy-12β-amino-5(6)-pregnene [cf. Example 1 of this specification] according to the following scheme:

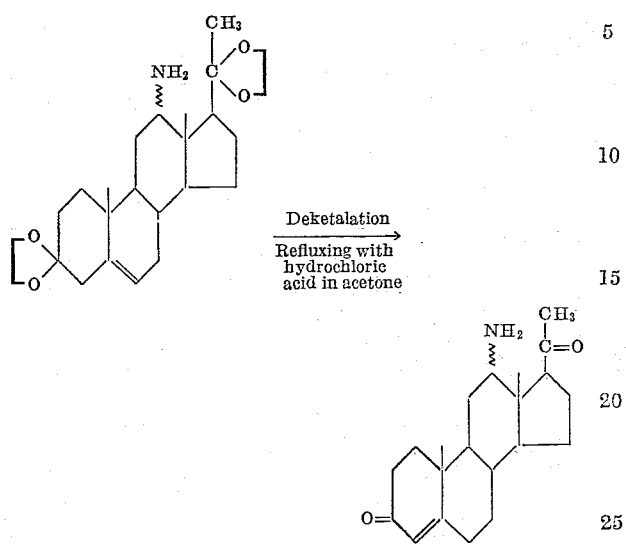

EXAMPLE 3

*Preparation of 3,3,20,20 - bisethylenedioxy - 12α - acetylamino - 5β - pregnene and 3,3,20,20 - bisethylenedioxy-12β-acetylamino-5β-pregnane*

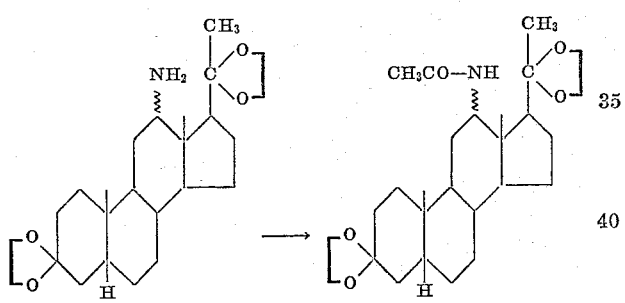

A mixture (2.5 g.) of 3,3,20,20-bisethylenedioxy-12α-amino-5β-pregnane and 3,3,20,20-bisethylenedioxy-12β-amino-5β-pregnane is dissolved in a mixture of pyridine (25 ml.) and acetic anhydride (25 ml.), and the resultant solution is stirred for 2 hours at 90° C. Aften concentration of the reaction mixture under reduced pressure to a half volume, the condensate is combined with water. The precipitated crystals are collected by filtration, washed with water and recrystallized from methanol to give 3,3,20,20-bisethylenedioxy - 12α - acetylamino - 5β - pregnane (962 mg.) as crystals melting at 219 to 222° C. The mother liquor from which the crystals were separated above is shaken with ether. The ether extract is washed with water, dried and the solvent evaporated. The resulting oil is treated with methanol to give 3,3,20,20-bisethylenedioxy-12β-acetylamino-5β-pregnane (1.33 g.) as crystals melting at 132 to 135° C.

*3,3,20,20 - bisethylenedioxy - 12α - acetylamino - 5β-pregnane.*—$[\alpha]_D^{24.5}$ +99±2° (chloroform).

IR: $\nu_{max.}^{chloroform}$ 3451, 1667, 1502, 1097, 1057, 1032, 1000, 947 cm.$^{-1}$ Anal. Calcd. for $C_{27}H_{43}O_5N$: C, 70.25; H, 9.39; N, 3.03. Found: C, 70.15; H, 9.47; N, 3.28.

*3,3,20,20 - bisethylenedioxy - 12β - acetylamino - 5β-pregnane.*—$[\alpha]_D^{24.5}$+41±2° (chloroform).

IR: $\nu_{max.}^{chloroform}$ 3350, 1660, 1525, 1118, 1096, 1038, 1015, 1000, 946, 876 cm.$^{-1}$ Anal. Calcd. for $C_{27}H_{43}O_5N \cdot \frac{1}{2}CH_3OH$: C, 69.13; H, 9.50; N, 2.93. Found: C, 69.32; H, 9.50; N, 3.23.

The starting material of this example, a mixture of 3,3,20,20 - bisethylenedioxy - 12α - amino - 5β - pregnane and 3,3,20,20 - bisethylenedioxy - 12β - amino - 5β - pregnane, is prepared from 3,3,20,20-bisethylenedioxy-12α-hydroxy-5β-pregnane [Engel et al.: J. Org. Chem., vol. 26, page 2869 (1961)] according to the following scheme:

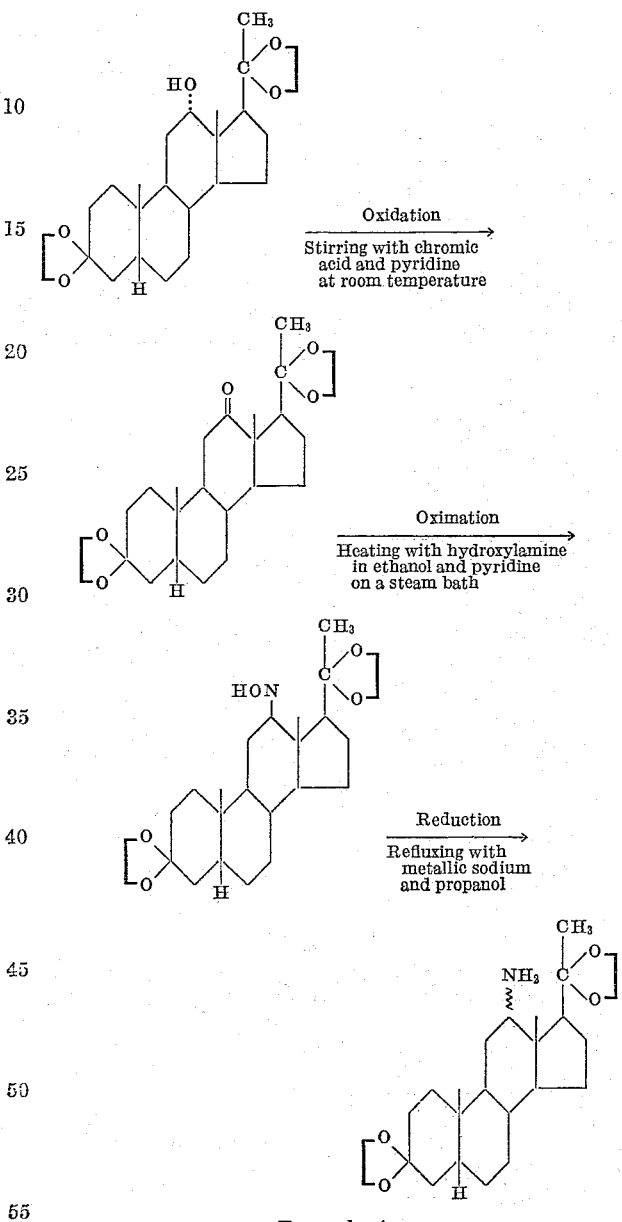

Example 4

*Preparation of 3,20-dioxo-12α-acetylamino-5β-pregnane and 3,20-dioxo-12β-acetylamino-5β-pregnane*

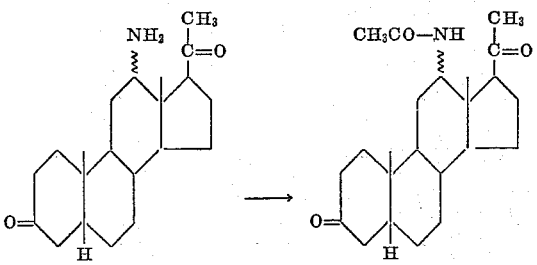

A mixture of 3,20-dioxo-12α-amino-5β-pregnane and 3,20-dioxo-12β-amino-5β-pregnane is subjected to acetylation as in Example 3 whereby 3,20-dioxo-12α-acetylamino-β-pregnane and 3,20-dioxo-12β-acetylamino-5β-pregnane are obtained as prisms melting at 160 to 162°

C. (crystallized from methanol) and blocks melting at 154 to 155° C. (crystallized from ether), respectively.

*3,20 - dioxo - 12α - acetylamino - 5β-pregnane.*—$[\alpha]_D^{24}$ +156±2° (chloroform).

IR: $\nu_{max.}^{chloroform}$ 3450; 1700, 1667, 1501 cm.$^{-1}$

Anal. Calcd. for $C_{23}H_{35}O_3N \cdot CH_3OH$: C, 71.07; H, 9.69; N, 3.45. Found: C, 70.89; H, 9.78; N, 3.76.

*3,20-dioxo-12β-acetylamino-5β-pregnane.*—$[\alpha]_D^{24}$ +25 ±2° (chloroform).

IR: $\nu_{max.}^{chloroform}$ 3431, 3366, 1705, 1662, 1511, 1162, 1098 cm.$^{-1}$ Anal. Calcd. for $C_{23}H_{35}O_3N$: C, 73.95; H, 9.45; N, 3.75. Found: C, 73.93; H, 9.54; N, 3.87.

The starting material of this example, a mixture of 3,20 - dioxo - 12α-amino-5β-pregnane and 3,20-dioxo-12β-amino-5β-pregnane, is prepared from a mixture of 3,3,20,20-bisethylenedioxy-12α-amino-5β-pregnane and 3,3,20,20-bisethylenedioxy-12β-amino-5β-pregnane (cf. Example 3 of this specification) according to the following scheme:

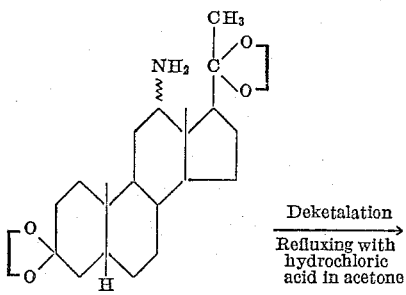

*Example 5*

Preparation of 3β,20β-dihydroxy-12β-formylamino-5α-pregnane and 3β-formyloxy-12β-formylamino-20β-hydroxy-5α-pregnane

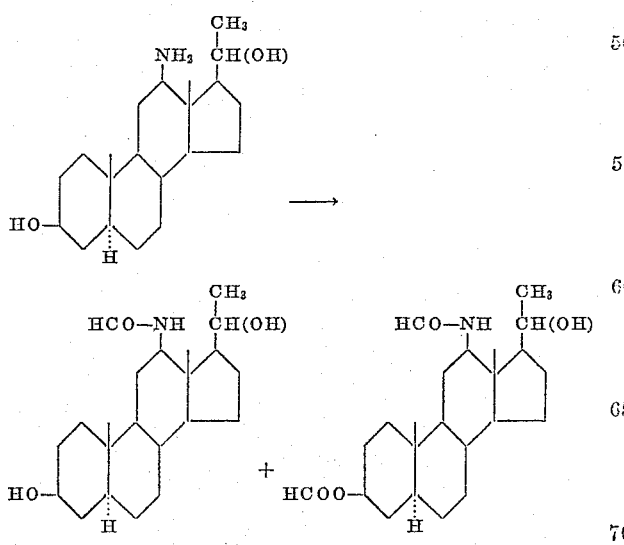

A solution of 3β,20β-dihydroxy-12β-amino-5α-pregnane (1.0 g.) in ethyl formate (35 ml.) is heated for 15 hours at 100° C. in an autoclave. The reaction mixture is filtered to separate the crystallized pillars (620 mg.). The filtrate is condensed and treated with a mixture of methanol and acetone. The precipitated crystals (102 mg.) are collected by filtration, combined with the above separated pillars and recrystallized from a mixture of methanol and acetone to give 3β,20β-dihydroxy-12β-formylamino-5α-pregnane (630 mg.) as crystals melting at 246 to 248° C. The mother liquor from which the crystals were separated above is evaporated and the residue (300 mg.) chromatographed on alumina. The eluate with benzene-chloroform (5:1) is evaporated and crystallized from acetone to give 3β-formyloxy-12β-formylamino-20β-hydroxy-5α-pregnane (70 mg.) as crystals melting at 188 to 189° C.

*3β,20β - dihydroxy - 12β - formylamino-5α-pregnane.*—$[\alpha]_D^{25}$ −25±2° (methanol).

IR: $\nu_{max.}^{Nujol}$ 1668, 1560 cm.$^{-1}$

Anal. Calcd. for $C_{22}H_{37}O_3N$: C, 72.68; H, 10.26; N, 3.85. Found: C, 72.68; H, 10.39; N, 3.71.

*3β - formyloxy - 12-formylamino-20β-hydroxy-5α-pregnane.*—$[\alpha]_D^{23}$ −20±2° (methanol).

IR: $\nu_{max.}^{Nujol}$ 1730, 1670, 1535, 1182 cm.$^{-1}$

Anal. Calcd. for $C_{23}H_{37}O_4N$: C, 70.55; H, 9:53; N, 3.58. Found: C, 70.74; H, 9.68; N, 3.66.

The starting material of this example, 3β,20β-dihydroxy-12β - amino - 5α - pregnane, is prepared from 3β,20β-dihydroxy-12-oxo-5α-pregnane [Kirk et al.: J. Chem. Soc., page 1046 (1957)] according to the following scheme:

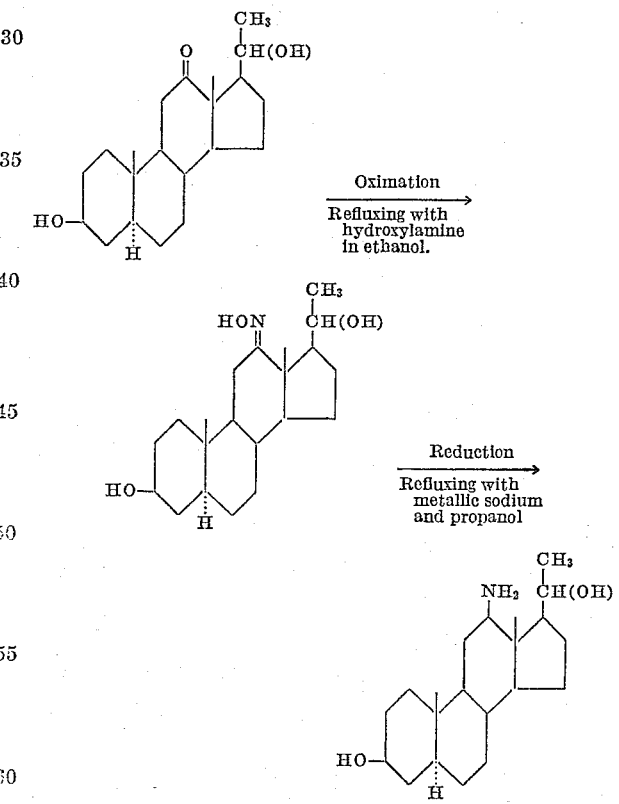

*Example 6*

Preparation of 3β,20β-dihydroxy-12α-formylamino-5α-pregnane

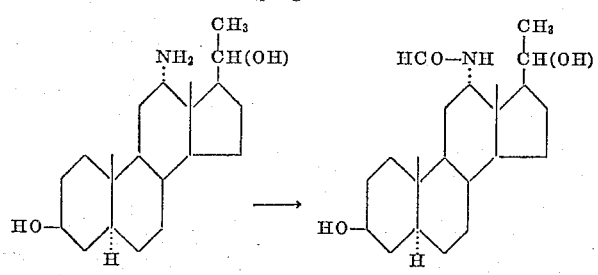

A solution of 3β,20β-dihydroxy-12α-amino-5α-pregnane (380 mg.) in ethyl formate (30 ml.) is heated for 15 hours at 100° C. in an autoclave. After concentration of the reaction mixture under reduced pressure, the residue is crystallized from ethyl acetate to give 3β,20β-dihydroxy-12α-formylamino-5α-pregnane (320 mg.) as crystals melting at 264 to 266° C. $[\alpha]_D^{22.5}$ +53±2° (methanol).

IR: $\nu_{max.}^{Nujol}$ 1660, 1640, 1550 cm.$^{-1}$

Anal. Calcd. for $C_{22}H_{37}O_3N$: C, 72.68; H, 10.26; N, 3.83. Found: C, 72.35; H, 10.42; N, 3.84.

The starting material of this example, 3β,20β-dihydroxy-12α-amino-5α-pregnane, is prepared from 3β,20β-dihydroxy-12-hydroxyimino-5α-pregnane (cf. Example 5 of this specification) according to the following scheme:

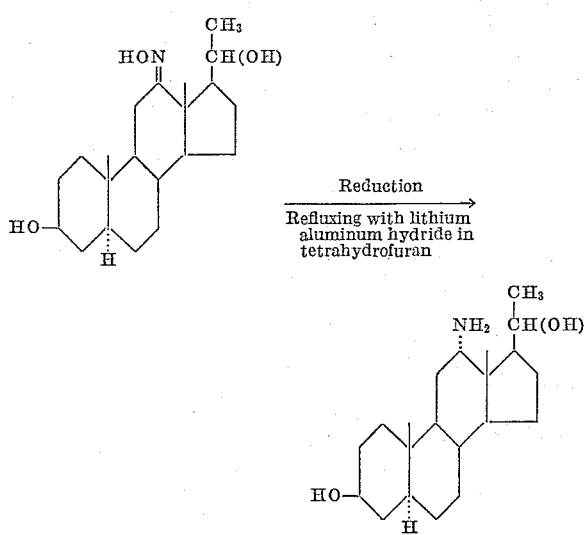

EXAMPLE 7

*Preparation of 3β,20β-dihydroxy-12β-acetylamino-5α-pregnane*

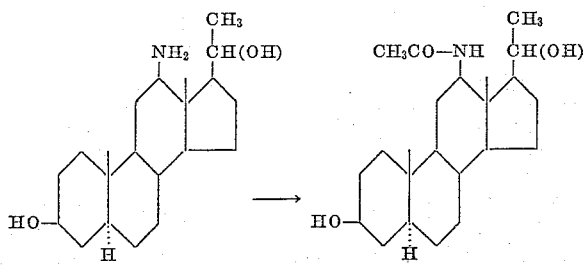

A solution of 3β,20β-dihydroxy-12β-amino-5α-pregnane (1 g.) in chloroform (20 ml.) is combined with acetic anhydride (5 ml.) and the resultant mixture is stirred for 30 minutes at room temperature (15 to 30° C.). The precipitated crystals are collected by filtration, combined with n-heptane and evaporated under reduced pressure to dryness. The resulting dried crystals are recrystallized from a mixture of methanol and chloroform to give 3β,20β-dihydroxy-12β-acetylamino-5α-pregnane (992 mg.) as crystals melting at 294 to 296° C. $[\alpha]_D^{26}$ −35.9±2° (chloroform-methanol=1:1).

IR: $\nu_{max.}^{Nujol}$ 3200, 3070, 1644, 1563 cm.$^{-1}$

Anal. Calcd. for $C_{23}H_{39}O_3N$: C, 73.16; H, 10.41; N, 3.71. Found: C, 73.18; H, 10.72; N, 3.79.

EXAMPLE 8

*Preparation of 3β,20β-dihydroxy-12α-acetylamino-5α-pregnane*

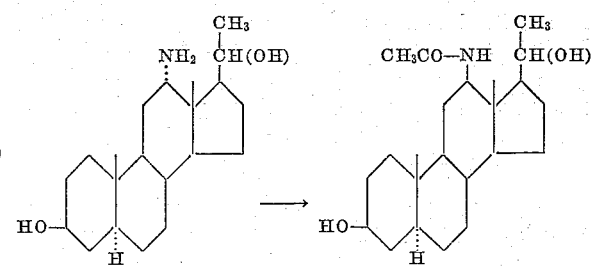

A solution of 3β,20β-dihydroxy-12α-amino-5α-pregnane (1.0 g.) in chloroform (20 ml.) is combined with acetic anhydride (5 ml.), and the resultant mixture is stirred for 30 minutes at room temperature (15 to 30° C.). After removal of chloroform under reduced pressure, the residue is combined with water (100 ml.), made to alkalinity with aqueous potassium carbonate and shaken with chloroform. The chloroform extract is washed with water, dried over anhydrous sodium sulfate and the solvent removed. The residue is combined with n-heptane and evaporated under reduced pressure to dryness. The dried substance is crystallized from ethyl acetate to give 3β,20β-dihydroxy-12α-acetylamino-5α-pregnane (738 mg.) as crystals melting at 250 to 252° C. $[\alpha]_D^{24.5}$ +25±2° (chloroform-methanol=1:1).

IR: $\nu_{max.}^{Nujol}$ 3300, 1625, 1552 cm.$^{-1}$

Anal. Calcd. for $C_{23}H_{39}O_3N$: C, 73.16; H, 10.41; N, 3.71. Found: C, 73:07; H, 10.55; N, 3.52.

EXAMPLE 9

*Preparation of 3β,20β-diacetyloxy-12β-acetylamino-5α-pregnane*

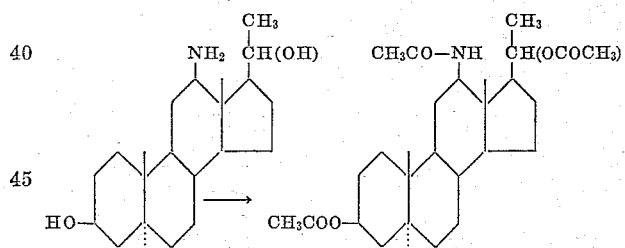

A mixture of 3β,20β-dihydroxy-12β-amino-5α-pregnance (500 mg.) and acetic anhydride (10 ml.) is heated for 1 hour while refluxing. After removal of acetic anhydride under reduced pressure, the residue is combined with water and shaken with ether. The ether extract is chromatographed on alumina for purification whereby there is obtained 3β,20β-diacetyloxy-12β-acetylamino-5α-pregnane (153 mg.) as crystals melting at 211 to 212.5° C. $[\alpha]_D^{26}$ +12±4° (chloroform).

IR: $\nu_{max.}^{Nujol}$ 3398, 1721, 1674, 1514, 1269 cm.$^{-1}$

Anal. Calcd. for $C_{27}H_{43}O_5N$: C, 70.25; H, 9.39; N, 3.03. Found: C, 70.03; H, 9.47; N, 3.09.

EXAMPLE 10

*Preparation of 3β,20β-diacetyloxy-12α-acetylamino-5α-pregnane*

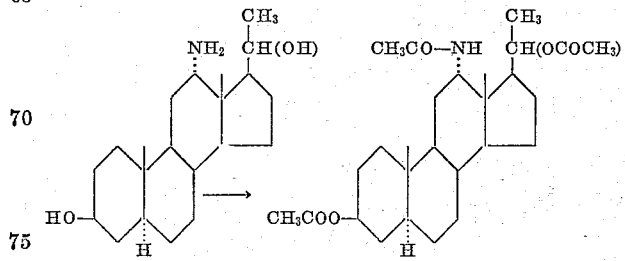

A solution of 3β,20β-dihydroxy-12α-amino-5α-pregnane (342 mg.) in acetic anhydride (7 ml.) is refluxed for 1 hour in an oil bath (temperature, 150° C.). After removal of acetic anhydride under reduced pressure, the residue is combined with water and shaken with ether. The ether extract is evaporated and crystallized from methanol to give 3β,20β-diacetyloxy-12α-acetylamino-5α-pregnane (508 mg.) as crystals melting at 211 to 213° C. [α]$_D^{22}$ +105±2° (chloroform).

IR: $\nu_{max}^{Nujol}$ 3317, 1735, 1636, 1539, 1252 cm.$^{-1}$

Anal. Calcd. for $C_{27}H_{43}O_5N$: C, 70.25; H, 9.39; N, 3.03. Found: C, 70.08; H, 9.38; N, 3.02.

EXAMPLE 11

*Preparation of 3β-hydroxy-12β-acetylamino-20β-acetyloxy-5α-pregnane*

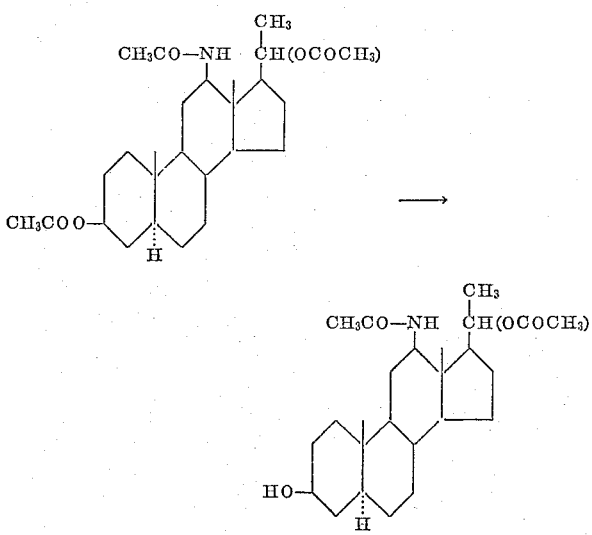

A solution of 3β,20β-diacetyloxy-12β-acetylamino-5α-pregnane (200 mg.) in a mixture of 5% sodium bicarbonate (2 ml.), methanol (6 ml.) and water (2 ml.) is refluxed for 10 minutes in nitrogen stream. To the reaction mixture, there is added a large amount of water whereby white crystals are precipitated. The crystals are collected by filtration, washed with water, dried and chromatographed on alumina. The eluate with chloroform is evaporated and crystallized from ethyl acetate to give 3β-hydroxy-12β-acetylamino-20β-acetyloxy-5α-pregnane (175 mg.) as crystals melting at 219 to 221° C. [α]$_D^{22.5}$ +18±4° (chloroform-methanol=1:1).

IR: $\nu_{max}^{Nujol}$ 3586, 3237, 1732, 1636, 1567, 1248 cm.$^{-1}$

Anal. Calcd. for $C_{25}H_{41}O_4N$: C, 71.56; H, 9.85. Found: C, 71.65; H, 9.92.

EXAMPLE 12

*Preparation of 3β-hydroxy-12α-acetylamino-20β-acetyloxy-5α-pregnane*

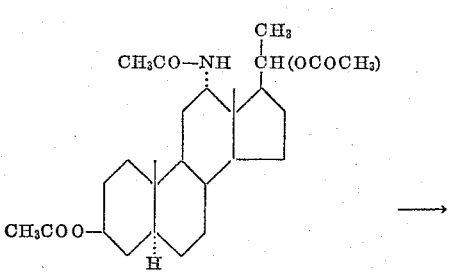

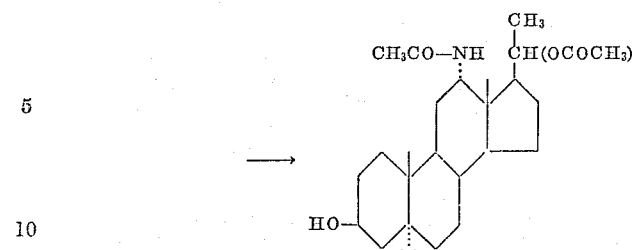

3β,20β-diacetyloxy-12α-acetylamino-5α-pregnane is subjected to hydrolysis as in Example 11 to give 3β-hydroxy-12α-acetylamino-20β-acetyloxy-5α-pregnane as crystals melting at 323 to 325° C. (decomp.) (crystallized from a mixture of chloroform and methanol). [α]$_D^{26}$ +142±3° (chloroform-methanol=1:1).

IR: $\nu_{max}^{Nujol}$ 3342, 1731, 1640, 1528, 1239 cm.$^{-1}$

Anal. Calcd. for $C_{25}H_{41}O_4N$: C, 71.56; H, 9.85; N, 3.34. Found: C, 71.47; H, 9.99; N, 3.13.

EXAMPLE 13

*Preparation of 3β,20β-dihydroxy-12α-acetylamino-5α-pregnane*

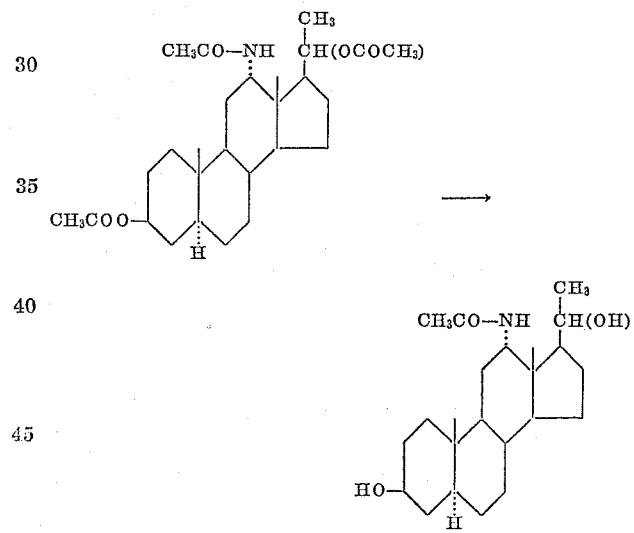

A mixture of 3β,20β-diacetyloxy-12α-acetylamino-5α-pregnane (100 mg.) and potassium hydroxide (500 mg.) in methanol (10 ml.) is refluxed for 3 hours in nitrogen stream. The reaction mixture is combined with water and shaken with chloroform. The chloroform extract is dried and the solvent removed. The residue is crystallized from hydrous methanol to give 3β,20β-dihydroxy-12α-acetylamino-5α-pregnane (50 mg.) as crystals melting at 250 to 252° C.

EXAMPLE 14

*Preparation of 3β,20β-dihydroxy-12β-acetylamino-5α-pregnane and 3β-acetyloxy-12β-acetylamino-20β-hydroxy-5α-pregnane*

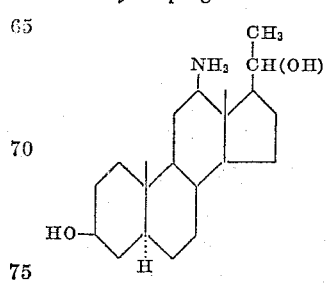

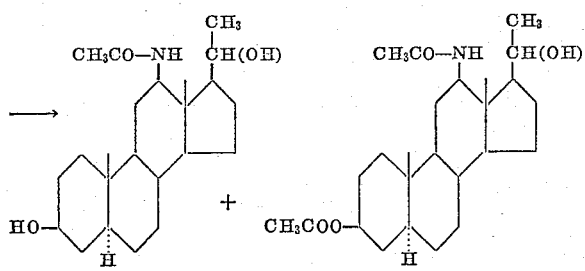

A mixture of 3β,20β-dihydroxy-12β-amino - 5α - pregnane (200 mg.), acetic anhydride (2 ml.) and chloroform (6 ml.) is refluxed for 4 hours in an oil bath (temperature, 130° C.). After cooling, the precipitate is collected by filtration, washed with water and dried to give 3β,20β-dihydroxy-12βacetylamino-5α-pregnane (38 mg.) as crude crystals melting at 281 to 291° C. The filtrate is evaporated under reduced pressure and the residue crystallized from ethyl acetate to give 3β-acetyloxy-12β-acetylamino-20β-hydroxy-5α-pregnane (102 mg.) as crystals melting at 200 to 201° C. $[\alpha]_D^{26}$ —40±2° (chloroform).

IR: $\nu_{max}^{Nujol}$ 3219, 3070, 1738, 1645, 1580, 1246 cm.$^{-1}$

Anal. Calcd. for $C_{25}H_{41}O_4N$: C, 71.56; H, 9.85; N, 3.34. Found: C, 71.75; H, 9.56; N, 3.32.

EXAMPLE 15

*Preparation of 3β-acetyloxy-12α-acetylamino-20β-hydroxy-5α-pregnane*

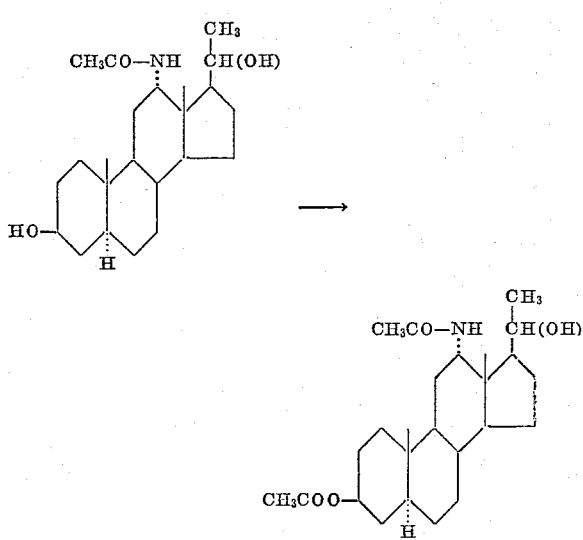

A mixture of 3β,20β-dihydroxy-12α-acetylamino-5α-pregnane (97 mg.), acetic anhydride (1 ml.) and chloroform (2 ml.) is refluxed for 1 hour in an oil bath (temperature, 150° C.). The reaction mixture is combined with water and shaken with chloroform. The chloroform extract is washed with water, dried and the solvent evaporated. The residue is chromatographed on alumina. The eluate with benzene is evaporated and crystallized from ethyl acetate to give 3β-acetyloxy-12α-acetylamino-20β-hydroxy-5α-pregnane (73 mg.) as crystals melting at 221 to 223° C. $[\alpha]_D^{22.5}$ +15±2° (chloroform).

IR: $\nu_{max}^{Nujol}$ 3374, 3270, 1734, 1623, 1557, 1248 cm.$^{-1}$

Anal. Calcd. for $C_{25}H_{41}O_4N$: C, 71.56; H, 9.85; N, 3.34. Found: C, 71.25; H, 9.86; N, 3.65.

EXAMPLE 16

*Preparation of various acetyl derivatives of 3β,20β-dihydroxy-12α-amino-5α-pregnane and 3β,20β-dihydroxy-12β-amino-5α-pregnane*

A mixture (1.0 g.) of 3β,20β-dihydroxy-12α-amino-5α-pregnane and 3β,20β-dihydroxy-12β-amino -5α - pregnane is dissolved in pyridine (15 ml.) and acetic anhydride (7.5 ml.) and the resultant mixture is allowed to stand at room temperature (15 to 30° C.) one overnight. The reaction mixture is combined with water and shaken with ether. The ether extract is washed with water, 5% hydrochloric acid, 5% sodium carbonate and water in order, dried and the solvent evaporated under reduced pressure. The residue (1.2 g.) is chromatographed on neutral alumina (33 g.). The eluate with benzene–benzene-chloroform (9:1) is evaporated and crystallized from ethyl acetate to give 3β-acetyloxy-12α-acetylamino-20β-hydroxy-5α-pregnane (74 mg.) as crystals melting at 220.5 to 222.5° C. The eluates with benzene-chloroform (7:3)–chloroform are evaporated and crystallized from ethyl acetate to give 3β-acetyloxy-12β - acetylamino - 20β - hydroxy-5α-pregnane (288 mg.) as crystals melting at 200 to 202° C. The eluates with petroleum ether-benzene-benzene obtained at the primary stage of the above chromatography are again chromatographed on alumina. The eluates with petroleum ether-benzene (1:2)–benzene are evaporated and crystallized from ethyl acetate to give 3β,20β-diacetyloxy-12α-acetylamino-5α-pregnane (180 mg.) as crystals melting at 212 to 214.5° C. The eluate with chloroform is evaporated and crystallized from a mixture of ethyl acetate and ether to give 3β,20β-diacetyloxy-12β-acetylamino-5α-pregnane (195 mg.) as crystals melting at 211 to 212° C. The uncrystallized portions on the above chromatographies are combined and hydrolyzed by heating with 3% methanolic potassium hydroxide in nitrogen stream for 1 hour while refluxing. The reaction mixture is condensed under reduced pressure, combined with water and shaken with chloroform. The chloroform extract is washed with water and evaporated under reduced pressure to dryness. The residue is crystallized from methanol to give 3β,20β-dihydroxy-12β-acetylamino-5α-pregnane (153 mg.) as crystals melting at 297 to 298° C. (decomp.). The mother liquor is evaporated and crystallized from methanol to give 3β-hydroxy-20β-acetyloxy-12α-acetylamino-5α-pregnane (20 mg.) as crystals melting at 320 to 324° C. (decomp.).

What is claimed is:

1. A compound selected from the group consisting of the compounds of the formulae:

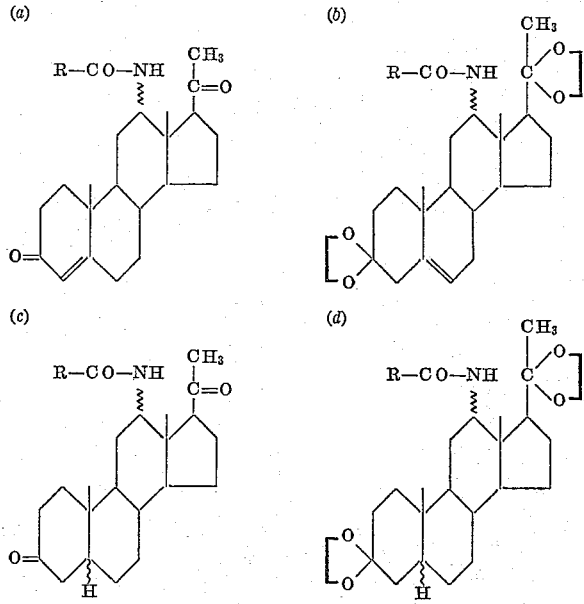

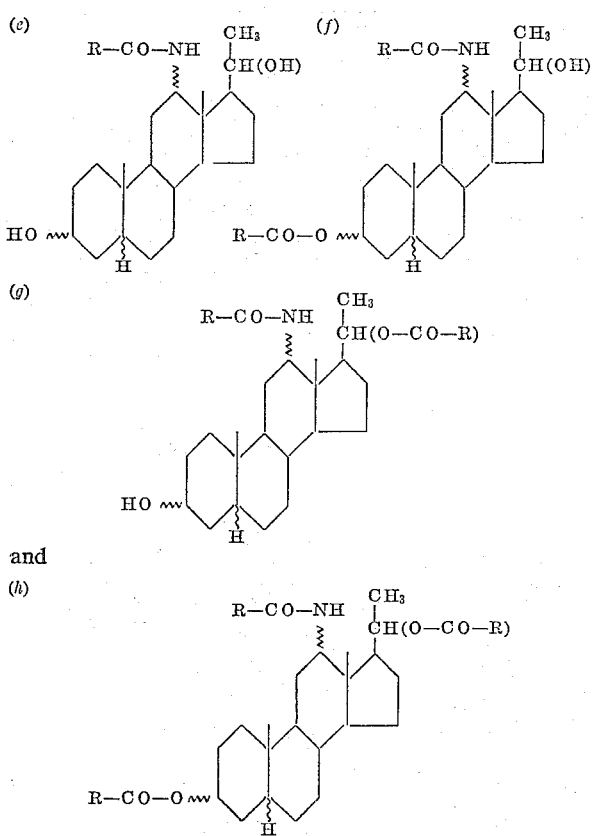

wherein R is a member selected from the group consisting of H and lower alkyl.

2. 3,3,20,20-bisethylenedioxy-12α-acetylamino - 5(6)-pregnene.
3. 3,3,20,20-bisethylenedioxy-12β-acetylamino - 5(6)-pregnene.
4. 3,20-dioxo-12α-acetylamino-4-pregnene.
5. 3,20-dioxo-12β-acetylamino-4-pregnene.
6. 3,3,20,20-bisethylenedioxy - 12α - acetylamino - 5β-pregnane.
7. 3,3,20,20-bisethylenedioxy - 12β - acetylamino - 5β-pregnane.
8. 3,20-dioxo-12α-acetylamino-5β-pregnane.
9. 3,20-dioxo-12β-acetylamino-5β-pregnane.
10. 3β,20β-dihydroxy-12α-formylamino-5α-pregnane.
11. 3β,20β-dihydroxy-12β-formylamino-5α-pregnane.
12. 3β-formyloxy-12β-formylamino-20β-hydroxy - 5α-pregnane.
13. 3β,20β-dihydroxy-12α-acetylamino-5α-pregnane.
14. 3β,20β-diacetyloxy-12α-acetylamino-5α-pregnane.
15. 3β-hydroxy-12α-acetylamino - 20β - acetyloxy - 5α-pregnane.
16. 3β-acetyloxy-12α-acetylamino - 20β - hydroxy - 5α-pregnane.
17. 3β,20β-dihydroxy-12β-acetylamino-5α-pregnane.
18. 3β-hydroxy-12β-acetylamino - 20β - acetyloxy - 5α-pregnane.
19. 3β-acetyloxy-12β-acetylamino - 20β - hydroxy - 5α-pregnane.

No references cited.

LEWIS GOTTS, *Primary Examiner.*